United States Patent [19]

Koshar et al.

[11] 4,313,988

[45] Feb. 2, 1982

[54] EPOXYPOLYSILOXANE RELEASE COATINGS FOR ADHESIVE MATERIALS

[75] Inventors: Robert J. Koshar, Mahtomedi; Stephen W. Bany, St. Paul, both of MN

[73] Assignee: Minnesota Mining and Manufacturing Company, St. Paul, Minn.

[21] Appl. No.: 216,684

[22] Filed: Dec. 15, 1980

Related U.S. Application Data

[63] Continuation-in-part of Ser. No. 124,634, Feb. 25, 1980.

[51] Int. Cl.³ .................... C09J 7/04; C09J 7/02; B32B 7/06
[52] U.S. Cl. .................... 428/40; 427/44; 427/54.1; 427/372.2; 427/208.4; 427/387; 428/42; 428/352; 428/354; 428/447; 428/413
[58] Field of Search .......... 428/352, 447, 42, 354, 428/40, 413; 427/208.4, 387, 44, 54.1, 372.2

[56] References Cited

U.S. PATENT DOCUMENTS

| | | | |
|---|---|---|---|
| 2,532,011 | 11/1950 | Dahlquist | 428/355 |
| 2,607,711 | 8/1952 | Hendricks | 428/355 |
| 2,876,894 | 3/1959 | Dahlquist | 428/355 |
| 3,055,774 | 9/1962 | Plueddemann | 428/447 |
| 3,328,482 | 6/1967 | Northrup | 428/447 |
| 3,342,625 | 9/1967 | Grossman | 428/355 |
| 3,527,659 | 9/1970 | Keil | 428/447 |
| 3,770,687 | 11/1973 | Metstetsky | 260/364 SB |
| 3,997,702 | 12/1976 | Schurb | 428/447 |
| 4,033,924 | 7/1977 | Mine | 260/375 B |
| 4,046,930 | 9/1977 | Johnson | 428/447 |
| 4,049,861 | 9/1977 | Nozari | 428/447 |
| 4,062,999 | 12/1977 | Kondo | 428/391 |
| 4,171,397 | 10/1979 | Morrow | 428/447 |
| 4,201,808 | 5/1980 | Cully | 428/42 |

FOREIGN PATENT DOCUMENTS 2057473  4/1981  United Kingdom.

Primary Examiner—Ellis P. Robinson
Attorney, Agent, or Firm—Cruzan Alexander; Donald M. Sell; Lorraine R. Sherman

[57] ABSTRACT

This invention relates to cured epoxypolysiloxanes and their blends with epoxy-terminated silanes which are useful as release coatings for adhesive roll and sheet materials.

24 Claims, No Drawings

EPOXYPOLYSILOXANE RELEASE COATINGS FOR ADHESIVE MATERIALS

This application is a continuation-in-part of copending application Ser. No. 124,634, filed Feb. 25, 1980.

BACKGROUND OF THE INVENTION

1. Field of the Invention

This invention relates to cured epoxypolysiloxanes and their blends with epoxy-terminated silanes which are useful as release coatings for adhesive roll and sheet materials.

2. Description of the Prior Art

Coatings having specific release properties toward adhesives are widely used. Polydimethylsiloxanes, polymers containing predominantly dimethylsiloxane units, provide very low release coatings, e.g., 4 to 16 g/cm width, for products such as labels or large sheets which contain normally tacky and pressure-sensitive adhesives. These polymers are less useful as release coatings on the back surface of adhesive tape (back surface coating of adhesive tape is known as "low adhesion backsize" [LAB]) because their low release force can cause roll instability. LABs for tapes in roll form ideally exhibit release toward the adhesive of about 60 to 350 g/cm width. Polymers with higher release values make it increasingly difficult to use the tape and delamination of the adhesive from the substrate often can result. Coatings having release values less than 60 g/cm width are useful as components for release liners. Many non-silicone polymers, e.g., urethanes, find use as low adhesion backsizes for pressure-sensitive tapes because of their much higher release force than the polydimethylsiloxanes, typically greater than 200 g/cm width. Such non-silicone LAB coatings are exemplified in U.S. Pat. Nos. 2,532,011, 2,607,711, 2,876,894 and 3,342,625.

For products such as tapes and liners, coatings having specific release properties toward adhesives, which are intermediate between those of the polydimethylsiloxanes and conventionally used non-silicone LAB coatings, are highly desired. Many previous attempts to provide such coatings by modification of polydimethylsiloxanes or blending them with less effective release material, as disclosed in, for example, U.S. Pat. Nos. 3,328,482, 3,527,659, 3,770,687 and 3,891,745, have not met with total success because of many problems such as: (1) incompatability of components causing extensive migration of the silicone to the surface, (2) contamination of the adhesive with low molecular weight components giving adhesion loss, (3) nonreproducibility, e.g., inability to consistently achieve the desired release level, and (4) use of excessively high cure temperatures causing deterioration of the heat-sensitive substrate or tape backing.

One of the best products of the type described in the preceding paragraph is disclosed in U.S. Pat. No. 4,171,397, which relates to plural coatings presenting areas of (1) fluorochemical polymer and (2) cured silicone polymer.

Coating compositions exhibiting intermediate release properties towards adhesives, provided by reaction of an isocyanate with a hydroxyl or amine-containing organosiloxane, are described in U.S. Pat. No. 3,997,702.

Epoxypolysiloxanes have been previously used as polymer components to impart water repellency to textile and paper (U.S. Pat. Nos. 4,046,930 and 3,055,774), treating agents for filling synthetic fiber (U.S. Pat. No. 4,062,999) and adhesion additives (U.S. Pat. No. 4,033,924). It is believed that the use of epoxypolysiloxanes to provide effective release coatings with pressure-sensitive adhesives has not been previously described.

SUMMARY OF THE INVENTION

The present invention provides reliably produced, cured epoxypolysiloxane polymers which are cross-linked, polymeric networks and which exhibit specific release properties toward tacky and pressure-sensitive adhesives throughout and beyond the range represented by the polydimethylsiloxanes at the low end and conventional non-silicone low adhesion backsizes at the other end. These polymers find utility as coatings for release liners, especially differential release liners, and low adhesion backsizes for tapes. The present invention provides novel release coatings with intermediate release properties, such coatings overcoming many of the aforementioned problems of the prior art and do so with a single coating.

The curable epoxypolysiloxanes useful in the invention can be fluids or much higher molecular weight greases or gums, and they can be cured with many types of epoxy curing catalysts well-known in the art in conjunction with heat or radiation. Although fluids having average molecular weights ranging from about 1,000 to 25,000 are preferred because of handling performance and versatility of application, e.g., 100% solids or solution coatings can be used, polymers having molecular weights up to $10^6$ or more can be used, especially as solution coatings. Generally, the very high molecular weight polymers are less convenient to use because of their high solution viscosities. A further disadvantage is that they can exhibit lower pot life when mixed in solution with some of the more active catalysts. Viscosities of the epoxypolysiloxane ranging from about 50 to 3,000 centipoises, measured at 23° C. using a Brookfield viscometer, are thus best used.

Epoxy-terminated silanes may be used optionally with the epoxypolysiloxanes in the coating formulation of this invention. These are compounds or materials having polymerizable epoxy group(s) and a polymerizable silane group.

The cured coating is conveniently obtained by mixing the epoxypolysiloxane and catalyst and optionally the epoxy-terminated silane in a solvent, coating the solution on the substrate and heating at a suitable curing temperature depending on the effectiveness of the catalyst and heat sensitivity of the substrate. Mixtures of the epoxypolysiloxanes or mixtures of the epoxysilanes may be used.

The polymers of the invention are best used as coatings upon a solid substrate, which may be a sheet, fiber or shaped object. The preferred substrate is one that is used for pressure-sensitive adhesive products. The substrates of choice are films of thermoplastic resins such as polyesters, polyamides, polyolefins, polycarbonates, polyvinylchloride, etc. and paper, although any surface requiring release toward adhesives can be used. Where the cured epoxypolysiloxane coating does not naturally adhere to the substrate, primers known in the art may be used without affecting the release performance of the epoxypolysiloxane coating.

DETAILED DESCRIPTION OF THE INVENTION

The curable epoxypolysiloxanes essential to this invention are represented by the formula,

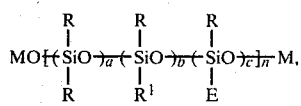

wherein R is a lower alkyl of one to three carbon atoms, $R^1$ is a monovalent hydrocarbon radical of 4 to 20 carbon atoms, E is a monovalent epoxy-containing hydrocarbon radical, M is a silyl group $R_3Si-$, $R_2R^1Si-$ or $R_2ESi-$, where R, $R^1$, and E are defined above, a is 5 to 200, b is 0 or up to 20% of a, a+b is 5 to 200, c may be 0 when M is $R_2ESi-$ or greater than 0 but less than 20% of the value of (a+b) when M is $R_3Si-$, $R_2R^1Si-$ or $R_2ESi-$, and n is 1 to 75. In the above formula, the preferred R group is methyl, and the preferred M group is $R_2ESi-$ when c is 0, and $R_3Si-$ when c is greater than 0. Also, when c is 0 and M is $R_2ESi-$, n is 1 to 5, and preferably n is 1 or 2.

It is apparent from the restrictions placed on the above composition that not all types of epoxypolysiloxanes are useful to provide effective release coatings. For example, when c is greater than 20% of (a+b), release of the cured coating toward adhesives is very high and can be so high as to cause delamination of the adhesive from the substrate. When c is less than about 0.5% of (a+b) and M is $R_3Si-$, curing is more difficult to achieve, e.g., very high temperatures and reaction times are necessary. Similarly, the value of b can affect release performance. For example, when b is greater than 20% of a and $R^1$ is a long chain hydrocarbon radical, e.g., octadecyl or higher alkyl, release can be so high as to cause delamination of the adhesive from the substrate. The preferred b is 0.

Illustrative examples of the monovalent hydrocarbon radical, $R^1$, in the above formula are alkyl radicals such as butyl, isobutyl, tert-butyl, hexyl, octyl and octadecyl; aryl radicals such as phenyl, naphthyl and bisphenylyl; alkaryl radicals such as tolyl and xylyl; aralkyl radicals such as phenylmethyl, phenylpropyl and phenylhexyl; and cycloaliphatic radicals such as cyclopentyl, cyclohexyl and 3-cyclohexylpropyl; and ether oxygen- or ester oxygen-containing radicals such as ethoxypropyl, butoxybutyl, and ethoxycarbonylpropyl and the like. The preferred $R^1$ is alkyl of 4–8 carbon atoms.

The siloxane groups,

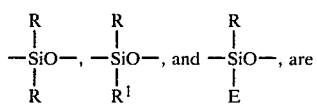

ordered or randomly arranged in the epoxypolysiloxane and the monovalent epoxy-containing hydrocarbon radical, E, contains at least one polymerizable epoxy group,

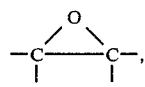

the remainder being composed of carbon and hydrogen, free of acetylenic unsaturation and in addition to the oxirane oxygen can contain ether, —O—, or carbonyl oxygen, e.g.,

Illustrative examples of E are:

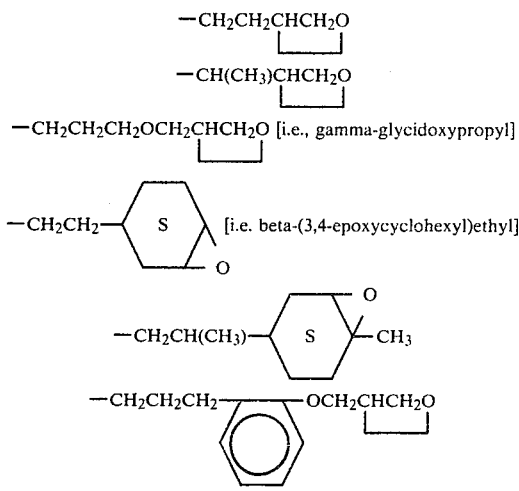

In the above epoxy-containing hydrocarbon radical, the epoxy group is preferably located at the terminal position of the radical, but it need not be a terminal group.

Due to the availability of starting materials, ease of preparation and performance, the preferred epoxypolysiloxanes are those where R is methyl, b is 0 and E is beta-(3,4-epoxycyclohexyl)ethyl or gamma-glycidoxypropyl.

The epoxypolysiloxanes can be prepared by many methods known in the art such as the chloroplatinic acid catalyzed addition reaction of hydrosiloxanes, containing the ≡SiH reactive group, with aliphatically unsaturated epoxy compounds, epoxidation of vinyl or like unsaturated siloxanes and Grignard type reactions as for example described by E. P. Plueddemann and G. Fanger, J. Am. Chem. Soc. 81, 2632-35 (1959). A convenient method is the hydrosiloxane addition reaction. When this method is used, it is preferred that essentially complete reaction of the ≡SiH sites are accomplished although small amounts of hydrogen attached to silicon can be present. It is also preferred for best results that the epoxypolysiloxane is essentially free from low molecular weight components such as cyclic siloxanes since their presence in the final cured coating could adversely affect the adhesion property of the adhesive (adhesion loss or buildup).

As mentioned above, epoxy-terminated silanes can be used optionally with the epoxypolysiloxanes in the coating formulation of this invention. Use of such epoxy-terminated silanes enables the release performance of the coating to be varied. These epoxy-terminated silanes are compounds or materials having polymerizable epoxy group(s) and a polymerizable silane group, the bridging of these groups being through a non-hydrolyzable aliphatic, aromatic or aromatic and aliphatic divalent hydrocarbon linkage which may contain ether or carbonyl oxygen linking groups. The epoxy-terminated silane is represented by the formula, $$(E)_{\overline{4-p}}Si(OR^2)_p,$$

wherein E is an epoxy-containing monovalent hydrocarbon radical defined above, p is 1 to 3 (preferably 3) and $R^2$ can be an aliphatic hydrocarbon radical of less than 10 carbon atoms such as alkyl (methyl, ethyl, isopropyl, butyl), an alkenyl such as allyl or vinyl, or an acyl radical such as formyl, acetyl, or propionyl. Because of availability and performance, the preferred $R^2$ is a lower alkyl such as methyl or ethyl. Many illustrative examples are described in U.S. Pat. No. 4,049,861. The preferred silane is beta-(3,4-epoxycyclohexyl)ethyltrimethoxysilane,

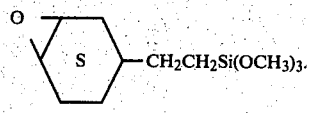

In addition to the silane, any hydrolyzate of the above silanes can be used. The hydrolyzate is formed by partial or complete hydrolysis of the silane $OR^2$ groups as described further in the above patent.

The amount of the epoxy-terminated silane or hydrolyzate can range from 0 to about 98% of the epoxypolysiloxane used, the amount being determined by the release performance desired. Generally, the higher amounts give the higher release values. Use of amounts greater than about 98% were found to be impractical. For example, use of 100% of the silane, i.e., no epoxypolysiloxane present, where $R^2$ is methyl, p=3 and E is beta(3,4-epoxycyclohexyl)ethyl, gave a hard abrasion-resistant coating, but the release toward an acrylic adhesive was found to be excessively high, causing delamination of the adhesive from the substrate.

Curing of the epoxypolysiloxane-containing compositions of this invention can be effected by mixing with conventional epoxy curing catalysts and may additionally require heat or radiation. Examples of epoxy curing catalysts are tertiary amines, Lewis acids and their complexes, such as $BF_3$ and complexes with ethers and amines; antimony halide-phosphorus containing ester complexes, such as with organophosphonates, mentioned below; polyaromatic iodonium and sulfonium complex salts (e.g., having $SbF_6$, $SbF_5OH$, $PF_6$, $BF_4$, or $A_sF_6$ anions, as disclosed in U.S. Pat. No. 4,101,513) and organic acids and their salts or other derivatives such as the highly fluorinated sulfonic and sulfonylic acids as described in U.S. Pat. No. 4,049,861. The presence of the catalyst in the cured composition does not affect its efficacy as a release material.

Not all catalysts are practical to use, however, because of such undesirable characteristics as: (1) high volatility, (2) corrosiveness, (3) inability to provide latent coating solutions, (4) inability to provide a totally cured coating at reasonable temperatures, e.g., below 130° C. required for heat-sensitive substrates, and (5) inability to provide adequate cure without use of excessive amounts of the catalyst which can cause contamination of the adhesive giving adhesive loss.

The preferred catalysts found useful to provide ideal release coatings for pressure-sensitive adhesives are complexes of antimony halides and organophosphorus containing esters referred to as the antimony halide-phosphorus containing ester catalysts, the sulfonium and iodonium catalysts, and the highly fluorinated sulfonic and sulfonylic acids and derivatives such as salt derivatives.

An example of an antimony halide-phosphorus containing ester catalyst is $SbCl_5.CH_3P(O)(OCH_3)_2$ formed by reaction of antimony pentachloride and dimethylmethylphosphonate. This and similar catalysts are the subject of assignee's copending patent applications, Ser. Nos. 124,836 and 124,837, filed Feb. 26, 1980, in the names of Robert J. Balchunis and Stephen W. Bany.

Another class of useful catalysts are the highly fluorinated sulfonic acids and salts represented by the formula, $$(R_fSO_3)_nR^3,$$

wherein $R^3$ is hydrogen, ammonium cation or metal cation, n is the valence of $R^3$, and $R_f$ is a highly fluorinated aliphatic radical having 1 to 12 carbon atoms. $R_f$ is preferably a perfluoroalkyl radical, e.g. $CF_3CF_2-$ having 1 to 8 carbon atoms. An example is $CF_3SO_3H$ and its salts. Use of sulfonic acids and salts as epoxy curing catalysts is described in U.S. Pat. No. 3,842,019.

Another class of effective catalysts are the sulfonylic catalysts represented by the formula, $$R_fSO_2-Q-SO_2R_f,$$

wherein $R_f$ is defined above and Q is a divalent radical selected from $-NH-$, $$-\overset{|}{C}HR^4-,\ -\overset{|}{C}R^4R^5-,\ \text{and}\ -\overset{|}{C}=CHR^6,$$

wherein $R^4$ is selected from hydrogen, chlorine, bromine, $R_fSO_2$, alkyl of 1-20 carbon atoms, alkenyl of 3 to 4 carbon atoms, aryl or aralkyl from 6 to 20 carbon atoms such as phenyl, naphthyl, 4-ethylphenyl, benzyl, and the like; $R^5$ is selected from hydrogen, chlorine, and bromine, and $R^6$ is selected from hydrogen, alkenyl (3 to 4 carbon atoms), and aryl up to 20 carbon atoms. In the above, $R^4$ can also be a substituted alkyl, e.g., substituted with non-basic groups such as chlorine, bromine, iodine, perfluoroalkylsulfonyl, nitro, carboxy or ester groups such as $-CH_2CH(SO_2R_f)_2$, $-CH_2CBr(CO_2C_8H_{17})_2$, $-CH_2CNO_2(CO_2C_2H_5)_2$, $-CH_2CHBrCH_2COOH$, and the like, and many of these types are very potent catalysts. Likewise, the above aryl groups can be substituted, such as 4-nitrophenyl, 3-chlorophenyl, and the like.

Preparation of the above catalysts where Q is $-CHR^4-$, $-CR^4R^5-$, and $$-\overset{|}{C}=CHR^6$$

is further described in U.S. Pat. Nos. 3,704,311, 3,776,960, 3,794,687, 3,932,526, 3,962,346 and 4,054,596. (See also U.S. Pat. No. 4,049,861).

All of the above sulfonylic catalysts where Q is the divalent $-NH-$ and $-CHR^4-$ are acidic compounds and can be readily converted to corresponding metal or ammonium cation salts which afford solutions of the epoxypolysiloxane and catalyst that are essentially unreactive at ambient temperature but on heating of the coating can rapidly polymerize to useful release coatings. "Ammonium cations" as used in the present invention are defined as cations of ammonia, primary, secondary, and tertiary amines. Use of such salts as epoxy curing catalysts is described in U.S. Pat. Nos. 3,586,616, 3,632,843, 3,842,019 and 4,031,036.

In the practice of this invention the epoxypolysiloxane, catalyst, and optionally, the epoxy-terminated silane are mixed in a solvent or, where possible, without solvent. The amount of catalyst used is about 1 to 5% by weight of the epoxy composition. The resultant material is coated on the substrate and cured at ambient temperatures or, where necessary, heated to temperatures of 25° C. to 150° C. In some cases, curing may be effected by radiation. Solvents which can be used include ethyl acetate, isopropyl acetate, acetone, methyl ethyl ketone, heptane, toluene, and mixtures thereof. The exact coating technique is not especially critical and any of several well known procedures can be used. Wirewound rods, such as a Meyer bar, or a rotogravure applicator roll having, for example, 80 lines per cm, provide uniform coatings. Optionally, a mixing spray nozzle having a line for the epoxypolysiloxane fluid or solution and a separate line for the catalyst solution can be used.

The initial release performance of the epoxypolysiloxane coating toward adhesives can be measured by various methods known in the art depending upon whether the final product is in sheet or rolled form such as a tape. Various test methods for pressure-sensitive tapes are reported by the Pressure Sensitive Tape Council (PSTC), "Test Methods for Pressure Sensitive Tapes" (several editions).

Objects and advantages of this invention are further illustrated by the following examples, but the particular materials and amounts thereof recited in these examples, as well as other conditions and details, should not be construed to unduly limit this invention.

EXAMPLE 1

This example describes the preparation of an epoxypolysiloxane used in the coating formulation. To a solution of 15 g (0.24 mol) of polyhydromethylsiloxane (DC 1107 from Dow Corning), 150 g (2.0 mol) of octamethylcyclotetrasiloxane and 14 g (0.09 mol) of hexamethyldisiloxane, contained in a narrow necked heavy-walled glass bottle, was added 0.3 g of conc. sulfuric acid and 2 g of activated carbon. The bottle was sealed and agitated in a water bath at 60° C. for 30 hours. The mixture was filtered using a filtering aid (Hyflo Suoer-Cel ®) and the solid rinsed with petroleum ether. The filtrate was stripped of solvent under reduced pressure and volatile silicone compounds were removed by heating at 160°–175° C. at 0.1 mm (3 hr). A clear fluid residue (158 g) having a viscosity of 75 centipoises (cps) at 23° C. and a SiH equivalent weight of 780 was obtained. This SiH prepolymer contained an average of 36 dimethylsiloxane units, 4 hydromethylsiloxane units, and 2 trimethylsilyl end groups.

The reaction of the SiH prepolymer with an olefinic epoxy compound was carried out as follows. To a solution of 31 g (0.25 mol) of 4-vinylcyclohexene monoxide and 75 ml of toluene, stirred under nitrogen at 85° C., was added 0.1 ml of a 10% solution of chloroplatinic acid catalyst in isopropyl alcohol. A solution of 155 g of the above described SiH prepolymer and 100 ml of toluene was then added over a period of 3 hr, additional catalyst was added (same amount as above), and the mixture stirred at 85° C. for 3 hr. The mixture was cooled and 0.3 ml of benzothiazole added. The resultant mixture was stirred for 1 hr, 2 g of activated carbon was added and the mixture then filtered using filtering aid and toluene rinse. The solvent was removed from the filtrate by distillation and the residue heated at 100° C. at 0.2 mm for 3 hr to remove any additional volatile components. The epoxypolysiloxane residue (176 g) was a fluid having a viscosity of 175 cps at 23° C. and an epoxy equivalent weight of 930. The polymer, designated as Epoxypolysiloxane A, contained the following average number of dimethylsiloxane units, methyl beta(3,4-epoxycyclohexyl)ethylsiloxane units and trimethylsiloxy units in the polymer:

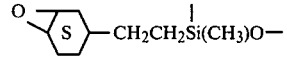

| Unit Contained In Epoxypolysiloxane A | Average Number of Units |
|---|---|
| (CH$_3$)$_2$SiO— | 36 |
| O⟨S⟩—CH$_2$CH$_2$Si(CH$_3$)O— | 4 |
| (CH$_3$)$_3$SiO— | 2 |

Using the above procedures, other epoxypolysiloxanes were prepared by reaction of the above olefinic epoxide or other types of olefinic epoxides with SiH prepolymers having different SiH content, molecular weights, and number of dimethylsiloxane units provided by varying the amounts of hexamethyldisiloxane (chain stopper) and octamethylcyclotetrasiloxane used in the preparation of the SiH prepolymer. Alternatively, other hydrocarbon olefins such as octene-1 in addition to the olefinic epoxide can be independently reacted with the SiH prepolymer giving epoxypolysiloxanes having the

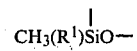

CH$_3$(R$^1$)SiO— structural unit; e.g., R$^1$ is octyl.

The following examples show construction of tapes and their performance.

EXAMPLES 2–5

The epoxypolysiloxanes, prepared according to the method of Example 1, designated as Epoxypolysiloxanes B to E, given in Table I, were trimethylsilyl end blocked and contained dimethylsiloxane units (~45 units) and varying amounts of methyl beta-(3,4-epoxycyclohexyl)ethyl siloxane units; the epoxy equivalent weight of each of the polymers is given in Table I. These polymers also had similar average molecular weights in the range of 3900 to 4300. It is apparent in Table I that by varying the epoxy equivalent weight, different release levels can be obtained. It is of note that the release force from the adhesive may be increased by decreasing the epoxy equivalent weight of the polymer.

The methods for preparation of tapes having a low adhesion backsize in accordance with the invention and the release performance of the tapes (Table I) are as follows. To the smooth, shiny side of a pretreated (corona discharge) substantially unoriented film (15 cm wide; 90 μm thick) of crystalline, pigmented polypropylene was applied a 3% solution (80/20 heptane/methyl ethyl ketone) of the epoxypolysiloxane and catalyst (antimony pentachloride/dimethylmethylphosphonate complex; 1.8% by weight of epoxypolysiloxane; solvent for catalyst, $CH_2Cl_2$) using a rotorgravure roll having 60 lines/cm. The coated film was heated in an oven at 75° C. (one minute residence). In a similar fashion, the reverse matte finish side of the polypropylene film was coated with a solution of a block copolymer based synthetic rubber/resin adhesive using a knife coater. The coated film was again heated at 75° C. for one minute, the film was wound, kept at 23° C. for 24 hr, and slit into 2.54 cm width rolls for testing.

The data referring to initial release and release after heat aging (Table I) were obtained by using Test Method PSTC-4 (11-70) modified as follows. A 13 cm length portion of the release tape as prepared above was applied to a steel test panel with the adhesive side down. Over this was applied a 25 cm length portion of a test tape (2.5 cm width, adhesive side down) so that overlap occurred, and pressed firmly with a 2 kg mechanically operated roller. [The test tape was composed of a 25 μm corona treated polyester film (a biaxially oriented polyethylene terephthalate) coated on one side with the synthetic rubber/resin adhesive (5 mg/cm²) described above and on the other side with a urethane low adhesion backsize]. The free end of the test tape was doubled back one inch at an angle of 180° and clamped onto the upper jaw of the tensile test machine. The panel, from which the test tape was removed, was clamped onto the lower jaw. The lower jaw was operated at 30 cm/min. Release values, obtained while the first 3 cm of test tape in contact with the LAB was removed, were disregarded. The average release value (grams per 2.5 cm of width) obtained during removal of the next 5 cm of test tape are given in Table I.

Heat aging of the roll of release tape was carried out at 50° C. for 15 days and then at 23° C. (24 hr) at 50% relative humidity.

The adhesion values given in Table I which measures properties of the pressure-sensitive adhesive side of the tape after contact with the silicone low adhesion backsize of the invention were obtained by using Test Method PSTC-1 (11-70). A 180° peel at 30 cm/min was used.

TABLE I

| Ex. | Epoxy-poly-siloxane | Epoxy Equiv. Wt. | Release, g/2.5 cm Initial | Release, g/2.5 cm 15 days, 50° C. | Adhesion (steel) kg/2.5 cm Initial | Adhesion (steel) kg/2.5 cm 15 days, 50° C. |
|---|---|---|---|---|---|---|
| 2 | B | 1000 | 223 | 228 | 2.35 | 2.41 |
| 3 | C | 1180 | 135 | 149 | 2.58 | 2.04 |
| 4 | D | 1650 | 96 | 128 | 2.33 | 2.33 |
| 5 | E | 1820 | 84 | 109 | 2.27 | 2.18 |

EXAMPLES 6–14

These examples (Table II) show the release performance using a combination of an epoxypolysiloxane and epoxysilane in the coating formulation. The epoxypolysiloxane used was Epoxypolysiloxane A (Example 1) and the epoxysilane used was beta(3,4-epoxycyclohexyl)ethyl-trimethoxysilane,

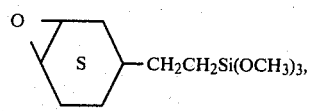

designated as Epoxysilane A. To a 15 ml solution of the epoxypolysiloxane and the epoxysilane in ethyl acetate (15% solids) was added one drop of 25% L-522 (Union Carbide inert silicone surfactant in ethyl acetate) and 0.15 g of 25% antimony pentachloride/dimethylmethylphosphonate catalyst in methyl ethyl ketone. The solution was coated on 100 μm polyvinylidene chloride primed polyester (polyethylene terephthalate) using a No. 8 RDS rod (R. D. Specialties, Inc.). The solvent was allowed to evaporate at 25° C. and the coated film heated at 90° C. for one minute. The side of the film containing the cured silicone release coating was then coated (~200 μm) with a solution (20% in heptane) of acrylic adhesive based on a 95/5 isooctylacrylate/acrylic acid copolymer using a knife coater. The adhesive coated film was heated to 72° C. for 5 minutes to remove solvent and the adhesive side laminated with 25 μm unprimed polyester by pressing between two rollers. The laminated sample was allowed to remain at room temperature for 24 hr, cut into 2.54 cm strips, and the strips tested for release using a release testing machine having a dial gauge. The release values were measured at 180° peel at the rate of 230 cm/min. Adhesion values were obtained by removing the adhesive strip and placing the adhesive side on a clean glass surface. A 2 kg roller was pulled over the strip three times and the adhesion value measured at 180° peel at the rate of 230 cm/min. In each case, three films were measured; the average release values and adhesion values are given in Table II.

TABLE II

| Ex. | Wt. Ratio, Epoxysilane A/ Epoxy-polysiloxane A | Release, g/2.5cm Acrylic Adhesive | Adhesion (glass), kg[a]/2.5cm Acrylic Adhesive |
|---|---|---|---|
| 6 | 20/1 | 709 | 1.12 |
| 7 | 10/1 | 410 | 1.25 |
| 8 | 2/1 | 213 | 1.24 |
| 9 | 1/1 | 156 | 1.24 |
| 10 | 1/2 | 128 | 1.24 |
| 11 | 1/4 | 85 | 1.24 |
| 12 | 1/10 | 71 | 1.22 |
| 13 | 1/20 | 57 | 1.25 |
| 14 | Epoxy-polysiloxane A (100%) | 99 | 1.28 |

[a]Aged laminates (72° C./20 hr) gave similar results

EXAMPLES 15–20

These examples (Table III) show the use of an epoxypolysiloxane containing methyloctylsiloxane units in combination with an epoxysilane to achieve variable release performance. The epoxypolysiloxane designated as Epoxypolysiloxane G is a trimethylsilyl end-blocked polymer having an average of about 40 dimethylsiloxane units, 5 methyloctylsiloxane units, and 5 methyl beta(3,4-epoxycyclohexyl)ethyl siloxane units. The epoxysilane was beta-(3,4-epoxycyclohexyl)ethyl trimethoxysilane, designated as Epoxysilane A. The substrate, coating procedures and testing procedures were similar to those described in the preceding examples (6–14). Releases toward the synthetic rubber/resin adhesive described in Examples 2–5 are given in Table III.

TABLE III

| Ex. | Wt. Ratio, Epoxysilane A/ Epoxy-polysiloxane G | Release, g/2.5cm Rubber/Resin Adhesive | Adhesion (glass), kg/2.5cm Rubber/Resin Adhesive |
|---|---|---|---|
| 15 | 50/1 | 454 | 3.55 |
| 16 | 20/1 | 255 | 3.41 |

TABLE III-continued

| Ex. | Wt. Ratio, Epoxysilane A/ Epoxy-polysiloxane G | Release, g/2.5cm Rubber/Resin Adhesive | Adhesion (glass), kg/2.5cm Rubber/Resin Adhesive |
|---|---|---|---|
| 17 | 10/1 | 99 | 3.35 |
| 18 | 4/1 | 71 | 3.41 |
| 19 | 1/4 | 35 | 3.35 |
| 20 | Epoxy-polysiloxane G (100%) | 14 | 3.35 |

EXAMPLES 21-22

The following examples show the use of other catalysts to provide useful release coatings. Coating and testing procedures were similar to those described in Examples 6-14. A solution of an epoxypolysiloxane fluid (similar to Epoxypolysiloxane A, having an epoxy equivalent weight of about 1000) and the ammonium salt of $C_4F_9SO_2NHSO_2CF_3$ (2% by wt., added as a 25% solution in methylene chloride) was coated on primed polyester on one side and the film heated at 90° C. (1 min.). The cured coating was transparent, tack-free and exhibited an initial release toward acrylic adhesive of about 20 g (2.5 cm width). Very similar results were obtained using $CF_3SO_2CH_2SO_2CF_3$ and $(CF_3SO_2)_2CHCH_2CBr(CO_2C_2H_5)_2$ as catalysts and ethyl acetate (20% solids) as solvent.

In a similar manner, a solution of the above epoxypolysiloxane fluid and triphenylsulfonium hexafluoroantimonate (2% by wt, methyl ethyl ketone as carrier) was coated on polyester and exposed to ultraviolet light using a UV Processor (PPG Industries, Model QC-1202). A tack-free, cured coating having release with acrylic adhesive of about 30 g/2.5 cm width was obtained.

EXAMPLES 23-24

These examples show the release performance using an epoxypolysiloxane, end-blocked with epoxy-containing silyl groups, in the coating formulation. An epoxypolysiloxane fluid having an epoxy equivalent weight of about 2650 (measured by titration) containing dimethylsiloxane units and terminated at each end with a beta(3,4-epoxycyclohexyl)ethyl dimethyl silyl group was prepared from the corresponding SiH end-blocked polydimethylsiloxane fluid and vinylcyclohexene monoxide using the hydrosilation procedure (Example 1). Tapes having the above cured epoxypolysiloxane low adhesion backsize (polypropylene as the substrate and the antimony pentachloride/dimethyl methylphosphonate complex catalyst) were constructed using procedures similar to those described in Examples 2-5. Test procedures were also similar except a test tape having a more aggressive adhesive was used. The initial release (average of three tapes) was 111 g/2.5 cm.

A similar type polydimethylsiloxane fluid having a lower epoxy equivalent weight of about 1475 which was also end-blocked with beta(3,4-epoxycyclohexyl)ethyl dimethylsilyl groups was cured and evaluated under similar conditions. In this case, the initial average release was 260 g/2.5 cm.

Various modifications and alterations of this invention will become apparent to those skilled in the art without departing from the scope and spirit of this invention, and it should be understood that this invention is not to be unduly limited to the illustrative embodiment set forth herein.

We claim:

1. A composite structure comprising a pressure-sensitive adhesive tape in which a backing is provided on one surface with a layer of normally tacky and pressure-sensitive adhesive and on the other surface with a low adhesion backsize which is the crosslinked, polymeric network reaction product of starting materials comprising (1) a curable epoxypolysiloxane, in solution or in the form of 100% solids, which is represented by the formula,

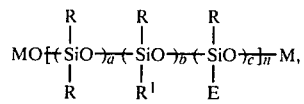

wherein

R is a lower alkyl group or radical of one to three carbon atoms, $R^1$ is a monovalent hydrocarbon radical of 4 to 20 carbon atoms, E is a monovalent epoxy-containing hydrocarbon radical, M is a silyl group $R_3Si-$, $R_2R^1Si-$ or $R_2ESi-$, where R, $R^1$, and E are defined above, a is 5 to 200, b is 0 or up to 20% of a, a+b is 5 to 200, c may be 0 when M is $R_2ESi-$ or is greater than 0 but less than 20% of the value of (a+b) when M is $R_3Si-$, $R_2R^1Si-$ or $R_2ESi-$, and n is 1 to 75;

provided that the monovalent epoxy-containing hydrocarbon radical, E, contains at least one polymerizable epoxy group,

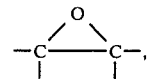

the remainder being composed of carbon and hydrogen free of acetylenic unsaturation and in addition to the oxirane oxygen can contain ether, $-O-$, or carbonyl oxygen,

(2) 0 to about 98% by weight of the epoxypolysiloxane described in (1) of an epoxy-terminated silane, which silane is represented by the formula,

wherein E is an epoxy-containing monovalent hydrocarbon radical defined above, p is 1 to 3 and $R^2$ can be an aliphatic hydrocarbon radical of less than 10 carbon atoms;

and said materials are cured in the presence of a catalytically effective amount of an epoxy curing catalyst.

2. The composite structure according to claim 24 wherein the siloxane groups, $$-\underset{\underset{R}{|}}{\overset{\overset{R}{|}}{SiO}}-, \quad -\underset{\underset{R^1}{|}}{\overset{\overset{R}{|}}{SiO}}-, \quad \text{and} \quad -\underset{\underset{E}{|}}{\overset{\overset{R}{|}}{SiO}}-,$$

are randomly arranged in said epoxypolysiloxane.

3. The composite structure according to claim 2 wherein R is methyl.

4. The composite structure according to claim 2 wherein b of said epoxypolysiloxane is equal to 0.

5. The composite structure according to claim 2 wherein $R^1$ of said epoxypolysiloxane is $C_4$ to $C_8$.

6. The composite structure according to claim 2 wherein M is $R_3Si$— when c is greater than 0.

7. The composite structure according to claim 2 wherein the epoxy-containing hydrocarbon radical, E, of the epoxypolysiloxane starting material has a terminal position epoxy group.

8. The composite structure according to claim 2 wherein said epoxypolysiloxane starting material comprises R equal to methyl, b equal to 0 and E is beta-(3,4-epoxycyclohexyl)ethyl, $-CH_2CH_2-\bigcirc\!\!\!\!\diagdown_O$, or gamma-glycidoxypropyl, $-CH_2CH_2CH_2OCH_2CHCH_2O.$ 9. The composite structure according to claim 2 wherein $R^2$ is lower alkyl.

10. The composite structure according to claim 2 wherein p is 3.

11. The composite structure according to claim 2 wherein the epoxy-terminated silane starting material is beta-(3,4-epoxycyclohexyl)ethyl trimethoxy silane, $\overset{O}{\diagdown}\!\!\!\!\bigcirc\!\!\!-CH_2CH_2Si(OCH_3)_3.$ 12. The composite structure according to claim 2 wherein said epoxypolysiloxane starting material has an average molecular weight ranging from $1 \times 10^3$ to $1 \times 10^6$.

13. The composite according to claim 2 wherein said epoxypolysiloxane starting material has an average molecular weight ranging from $1 \times 10^3$ to $2.5 \times 10^4$.

14. The composite structure according to claim 2 wherein M is $R_2ESi$— when c is 0 and n is 1 to 5.

15. The composite structure according to claim 14 wherein n is 1 or 2.

16. A composite structure according to claim 1 in which said low adhesion backsize consists essentially of the polymeric network reaction product of said curable epoxysiloxane and said epoxy-terminated silane.

17. A method of making a low adhesion backsize coating for a pressure sensitive adhesive tape, said coating affording accurately predictable and controllable release for a wide variety of normally tacky and sensitive adhesives, which method includes the steps of:

a. blending together in a mutually compatible solvent system, to form a solution, components comprising
(1) a curable epoxypolysiloxane which is represented by the formula, $$MO(\overset{\overset{R}{|}}{\underset{\underset{R}{|}}{Si}O})_a(\overset{\overset{R}{|}}{\underset{\underset{R^1}{|}}{Si}O})_b(\overset{\overset{R}{|}}{\underset{\underset{E}{||}}{Si}O})_c M,$$

wherein
R is a lower alkyl group or radical of one to three carbon atoms,
$R^1$ is a monovalent hydrocarbon radical of 4 to 20 carbon atoms,
E is a monovalent epoxy-containing hydrocarbon radical,
M is a silyl group $R_3Si$—, $R_2R^1Si$—, or $R_2ESi$—, where R, $R^1$, and E are defined above,
a is 5 to 200,
b is 0 or up to 20% of a,
a+b is 5 to 200,
c may be 0 when M is $R_2ESi$— or is greater than 0 but lesser than 20% of the value of (a+b) when M is $R_3Si$—, $R_2R^1Si$— or $R_2ESi$—, and
n is 1 to 75;
provided that the monovalent epoxy-containing hydrocarbon radical, E, contains at least one polymerizable epoxy group, $$-\underset{|}{C}\overset{O}{\overset{\diagup\diagdown}{\underset{|}{C}}}-,$$

the remainder being composed of carbon and hydrogen free of acetylenic unsaturated and in addition to the oxirane oxygen can contain ether, —O—, or carbonyl oxygen, $$-O\overset{\overset{O}{||}}{C}-,$$

and
(2) 0 to about 98% by weight of the epoxypolysiloxane described in (1) of an epoxy-terminated silane wherein said epoxy-terminated silane is represented by the formula, $(E)_{4-p}$—$Si(OR^2)_p$, wherein E is an epoxy-containing monovalent hydrocarbon radical defined above, p is 1 to 3 and $R^2$ can be an aliphatic hydrocarbon radical of less than 10 carbon atoms, b. admixing an effective amount of an epoxy curing catalyst,
c. coating the pourable liquid to form a thin film upon a substrate, and
d. heating or irradiating to effect reacting and curing of (1) and (2).

18. The method according to claim 17 wherein the siloxane groups,

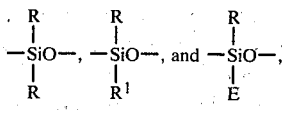

are randomly arranged in said epoxypolysiloxane.

19. The method according to claim 18 wherein said epoxy-curing catalysts are selected from antimony halide-phosphorus containing ester complexes, polyaromatic iodonium and sulfonium complex salts, and sulfonic and sulfonylic acids and their derivatives.

20. The method according to claim 18 wherein said epoxy curing catalyst is antimony pentachloridedimethylphosphonate complex, $SbCl_5 \cdot CH_3P(O)(OCH_3)_2$.

21. The method according to claim 18 wherein said epoxy curing catalyst is the ammonium salt of $R_fSO_2N\text{-}HSO_2R_f$ where $R_f$ is a perfluoroalkyl group having 1-8 carbon atoms.

22. A release liner in which a backing is provided on at least one surface with a thin release layer which is the crosslinked, polymeric network reaction product of starting materials comprising (1) a curable epoxypolysiloxane, in solution or in the form of 100% solids, which is represented by the formula,

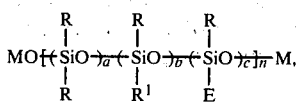

wherein

R is a lower alkyl group or radical of one to three carbon atoms, $R^1$ is a monovalent hydrocarbon radical of 4 to 20 carbon atoms, E is a monovalent epoxy-containing hydrocarbon radical, M is a silyl group $R_3Si—$, $R_2R^1Si—$, or $R_2ESi—$, where R, $R^1$, and E are defined above, a is 5 to 200, b is 0 or up to 20% of a a+b is 5 to 200, c may be 0 when M is $R_2ESi—$ or is greater than 0 but less than 20% of the value of (a+b) when M is $R_3Si—$, $R_2R^1Si—$ or $R_2ESi—$, and n is 1 to 75;

provided that the monovalent epoxy-containing hydrocarbon radical, E, contains at least one polymerizable epoxy group,

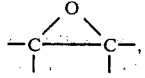

the remainder being composed of carbon and hydrogen free of acetylenic unsaturation and in addition to the oxirane oxygen can contain ether, —O—, or carbonyl oxygen,

(2) 0 to about 98% by weight of the epoxypolysiloxane described in (1) of an epoxy-terminated silane wherein said epoxy-terminated silane is represented by the formula,

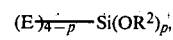

wherein E is an epoxy-containing monovalent hydrocarbon radical defined above, p is 1 to 3 and $R^2$ can be an aliphatic hydrocarbon radical of less than 10 carbon atoms;

cured in the presence of a catalytically effective amount of an epoxy curing catalyst.

23. The release liner according to claim 22 wherein the siloxane groups,

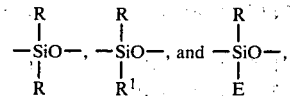

are randomly arranged in said epoxypolysiloxane.

24. The release liner according to claim 23 wherein the epoxy curing catalyst is an antimony halide-phosphorus containing ester complex.

* * * * *